United States Patent [19]

Tokura et al.

[11] Patent Number: 4,958,012

[45] Date of Patent: Sep. 18, 1990

[54] SQUID CHITIN FORMED MATERIAL

[75] Inventors: Seiichi Tokura, Sapporo; Tsuyoshi Koriyama, Hachioji; Yoshiyuki Chiba, Hachioji; Mikio Satake, Hachioji, all of Japan

[73] Assignee: Nippon Suisan Kaisha, Ltd., Tokyo, Japan

[21] Appl. No.: 319,724

[22] Filed: Mar. 7, 1989

[51] Int. Cl.$^5$ ............... C08B 37/00; A61K 31/00; D01C 3/00
[52] U.S. Cl. ........................... 536/20; 536/55.3; 514/55; 162/2; 162/9
[58] Field of Search ............... 536/20, 55.3; 514/55; 162/2, 9

[56] References Cited

U.S. PATENT DOCUMENTS

| | | | |
|---|---|---|---|
| 3,940,317 | 2/1976 | Katz et al. | 435/206 |
| 4,427,654 | 1/1984 | Austin | 424/95 |
| 4,575,519 | 3/1986 | Kifune et al. | 521/77 |

*Primary Examiner*—Ronald W. Griffin
*Assistant Examiner*—Everett White
*Attorney, Agent, or Firm*—Oblon, Spivak, McClelland, Maier & Neustadt

[57] ABSTRACT

A novel squid chitin formed material is disclosed. Squid chitin is prepared by pulverizing squid crust and treating the pulverized chitin with caustic soda and then with hydrochloric acid to remove proteins and ashes. Squid chitin formed material such as sheet or fiber is then prepared by a freeze-defrost treatment. The squid chitin sheet and fiber have better physical properties than conventional crab chitin formed materials in terms of strength and folding endurance.

8 Claims, No Drawings

SQUID CHITIN FORMED MATERIAL

BACKGROUND OF THE INVENTION

1. Field of the Invention

This invention relates to a novel squid chitin formed material, and, more particularly, to a squid chitin formed material, such as a squid chitin sheet, a squid chitin fiber, and the like. The squid chitin formed material has excellent characteristics such as superior strength and the like.

2. Description of the Background

Since formed materials made of chitin are in vivo decomposable, they are widely used as suture threads, wound covering or protecting materials, dialysis membranes, molecular filters, ultra-membrane filters, and the like.

According to a conventionally known method for preparing materials formed of chitin, exoskeletons of a crustacean or an insect are first treated with hydrochloric acid and sodium hydroxide, and chitin separated is formed into a sheet or the like (Japanese Patent Laid-open Nos. 53339/1986, 64256/1986, 129005/1986, and 212302/1986).

Chitins made from exoskeletons of crustacean or insects, however, exhibit only poor dope forming capability, resulting in formed chitin materials having inadequate characteristics such as insufficient strength, reduced elongation, or the like. Thus, chitins produced from conventional sources have problems still to be solved. In an attempt to improve the insufficient chitin properties, Japanese Patent Laid-open Nos. 53339/1986 and 64256/1986 propose to employ a water soluble polymer as a binder. This method, however, does not necessarily provide a satisfactory solution.

In view of this situation, the present inventors have undertaken extensive studies in order to solve the above problems, and found that among chitins produced from a number of raw materials squid chitins made from squid crust possessed excellent characteristics. The inventors have further found that among squid chitins those produced from squid galadius of Mollusca, Teuthoidea, had exceptionally superior characteristics, and could be formed into superb chitin sheets and the like. Such a finding has led to the completion of this invention.

SUMMARY OF THE INVENTION

Accordingly, an object of this invention is to provide a squid chitin formed material prepared from squid chitin which is separated from squid crust.

Other objects, features and advantages of the invention will hereinafter become more readily apparent from the following description.

DETAILED DESCRIPTION OF THE INVENTION AND PREFERRED EMBODIMENTS

Any squid crusts can be used as a raw material for preparing the squid chitin formed material of this invention so long as the crusts are those from squids belonging to the division of Mollusca, the order of Decapoda. Specific examples of the squids are those from the suborder Teuthoidea such as Spirula, Sepia, Sepiola, from the suborder Teutoidea such as Loligo, Doryteuthis, Sepioteuthis, Watasenia, Onychoteuthis, Architeuthis, Tadarodes, Chiroteuthis, Ommastrephes, Illex, Gonatopsis, and the like.

For preparing squid chitin from squid crust according to this invention, squid crust is first pulverized, and treated with caustic soda and hydrochloric acid to remove proteins and ashes. More specifically, taking the preparation of squid chitin from squid galadius as an example, the pulverized squid galadius is treated with sodium hydroxide solution of about 1 N at about 90° C. for approximately 1 hour. The treatment with hydrochloric acid is performed using an aqueous hydrochloric acid solution of around 0.1 N concentration at room temperature for about 1 hour. Squid chitin is then obtained by drying the treated material thus prepared.

For preparing the squid chitin sheet of this invention squid chitin sufficiently ground as fine as 16 mesh is suspended into water at a concentration of 5 to 20% by weight, stirred vigorously or subjected to a freeze-defrost treatment. Through these treatments the squid chitin absorbs water and swells increasing its viscosity, and ultimately becomes a gel. The gel is suspended into water and the suspension is submitted to a paper-making operation; i.e., it is fed onto a filter to eliminate water. The residue is then dried to produce a squid chitin sheet.

If the above-mentioned procedure is applied to crab chitin, even though it is submitted to the stirring operation or the freeze-defrost treatment, crab chitin does not form a gel. It is therefore necessary to manufacture a crab chitin sheet first to prepare crab chitin fiber and then to make the fiber into a sheet, as will be discussed later. Accordingly, a chitin sheet made from crab chitin is something like non-woven cloth, which is quite different from the squid chitin sheets prepared by this invention.

Squid chitin fiber can be prepared by the following method according to this invention. The squid chitin separated by the procedure mentioned above is dissolved into formic acid at a concentration of 2 to 15% by weight. (A specific squid chitin concentration in formic acid may vary depending on the purpose intended) Freeze-defrost treatments are performed two or three times on this solution to disintegrate inter- or intra-molecular hydrogen bonds of squid chitin and to produce a transparent and homogeneous dope. The dope is defoamed in vacuo and is extruded into a squid chitin coagulating-solvent to produce squid chitin fiber. An alcohol such as methanol, ethanol, propanol, butanol, or the like, or a ketone such as acetone, methyl ethyl ketone, or the like, or a mixture of two or more of these solvents can be used as a squid chitin coagulating-solvent.

If above procedure is to be applied to a chitin from exoskeletons of crabs, for example, 20 to 30 times freeze-defrost treatments are required. This takes a much longer period of time for the treatment. In addition, this long period treatment with formic acid reduces the polymerization degree of chitin molecules. This makes it impossible to produce a fiber having a sufficient strength.

Some of the characteristics of a squid chitin sheet and a squid chitin fiber prepared from the squid chitin of this invention are compared with those produced from a conventional crab chitin.

(1) Chitin sheet

Squid chitin sheet: prepared in Example 1
Crab chitin sheet: prepared in Reference Example 2

TABLE 1

| | Weight (g/m$^2$) | Breaking Strength (KPa m$^2$/g)* | Folding Endurance (Times)** |
|---|---|---|---|
| Squid chitin sheet | 29 | 9.0 | >16 (1 kg) |
| Crab chitin sheet | 115 | 1.5 | 10 (500 g) |

*Breaking Strength: The pressure (per unit weight of chitin sheet) required to pulverized a chitin sheet.
**Folding Endurance: A chitin sheet is folded while a pressure is exerted to the sheet using a 500 g or 1 kg plumb. "Folding Endurance" is the number of times for which the chitin sheet is folded before it is broken.

(2) Chitin fiber

Squid chitin fiber: prepared in Example 2
Crab chitin fiber: prepared in Reference Example 1

TABLE 2

| | Strength (g/d)* | Elongation (%)** |
|---|---|---|
| Squid chitin fiber | 5.0 | 5.0 |
| Crab chitin fiber | 1.6 | 4.3 |

*Strength (Pulling strength): The force required to break 50 strings of fiber.
**Elongation: A ratio of elongation (as per the original length) when 50 strings of fiber is pulled and broken.

As demonstrated in the above test, the squid chitin formed materials of this invention have better physical properties than conventional crab chitin formed materials in terms of strength, folding endurance, etc. Although the details are still to be elucidated, these superior characteristics are presumed to be a result of a more oriented nature of squid chitin crystals than crab chitin crystals.

Other features of the invention will become apparent in the course of the following description of the exemplary embodiments which are given for illustration of the invention and are not intended to be limiting thereof.

EXAMPLES

Example 1

(i) One (1) kg of Tadarodes galadius was ground by a feather mill (5 m/m screen pass). The ground galadius was put into a 1 N NaOH solution, heated at 90° C. for 1 hour, washed with water, and dipped into a 0.1 N HCl solution at room temperature for 1 hour. The ground material then was washed with water and again heated at 90° C. in a 1 N NaOH solution for 1 hour. After washing with water, the material was dried in an oven at 50° C. for 5 hours to produce 100 g of squid chitin.

(ii) Ten (10) g of the squid chitin produced in (i) above was pulverized by an Osterizer. The pulverized chitin was suspended into 400 ml of water and vigorously stirred to increase the viscosity. The viscous gel-like product thus obtained was subjected to a conventional water jet fall-type paper machine, each 20 ml a batch, and the sheet produced was air-dried at room temperature. The squid chitin sheet prepared having a weight of 29 g/m$^2$ had breaking strength of 9 KPa m$^2$/g and folding endurance of at least 16 at a 1 kg plumb weight.

Letters were printed with ink onto the squid chitin sheet. The ink was well attached onto the sheet with no run or blur.

Example 2

Twenty (20) g of the squid chitin produced in Example (i) was pulverized by an Osterizer to produce a homogeneous chitin particles. 500 ml of formic acid was added to the chitin particles. The mixture was stirred slowly, and allowed to stand at room temperature until needle-like solid materials contained disappeared. After freezing at −20° C., the frozen material was thawed, gently stirred, and was again frozen and thawed to produce a transparent and homogeneous dope. This dope was deaerated in vacuo, and extruded into a mixed solvent of acetone and 50% ethanol through a nozzle with 30 holes, each hole having a diameter of 0.09 m/m, at an extrusion pressure of 1.5 Kgf/cm$^2$, and an extender having a first roller rotating at 0.1 m/sec. and a second roller rotating at 0.11 m/sec., to produce wet squid fiber. The squid fiber was neutralized with a 0.5 N NaOH-methanol mixture, washed with methanol, and air-dried at room temperature to obtain dried squid chitin fiber.

The squid chitin fiber had strength (pulling strength) of 5.0 g/d and elongation of 5.0%. The squid chitin fiber produced according to this method possessed silky gloss.

Reference Example 1

(Preparation of crab chitin fiber)

(i) One (1) kg of Chionaecetes opilio crab shell (exoskeleton) was ground by a coffee grinder. The ground crab shell was put into a 1 N NaOH solution, heated at 90° C. for 1 hour, washed with water, dipped into a 2 N HCl solution at room temperature for 6 hours, and then was washed with water. This same procedure was performed 3 times. After washing with water, the finally obtained material was dried in an oven at 50° C. for 3 hours to produce 150 g of crab chitin.

(ii) Twenty-three (23) g of the crab chitin produced in (i) above was pulverized by an Osterizer and 490 ml of formic acid was added to the chitin particles. The mixture was stirred slowly, and allowed to stand at room temperature until needle-like solid materials contained disappeared. 12 hours after freezing at −20° C., the frozen material was thawed at room temperature. The thawed material was gently stirred, and again frozen to produce a dope. This frozing-thawing operation was once more repeated. The dope finally obtained was deaerated in vacuo, and extruded into a mixed solvent of ethyl acetate and water through a nozzle with 30 holes, each hole having a diameter of 0.09 m/m, at an extrusion pressure of 1.3 Kgf/cm$^2$, and extended at an extension ratio of 1.29. The crab fiber was washed in a stream of water overnight to obtain wet crab chitin fiber.

(iii) The wet crab chitin fiber was air-dried at room temperature to obtain dried crab chitin fiber.

Reference Example 2

Preparation of crab chitin sheet)

The crab chitin fiber prepared in Reference Example 2 was cut into 5 m/m length, and a prescribed amount of the cut crab chitin fiber was suspended into water. A conventional water jet fall-type paper milling was performed on the crab chitin suspension, and a sheet produced was air-dried at room temperature to produce a crab chitin sheet.

Obviously, numerous modifications and variations of the present invention are possible in light of the above teachings. It is therefore to be understood that the scope of the appended claims, the invention may be practiced otherwise than as specifically described herein.

What is claimed as new and desired to be secured by letters patent is:

1. A process of preparing a squid chitin sheet comprising: grinding squid chitin, suspending the ground squid chitin in water, forming a gel of said squid chitin, suspending the gel in water, submitting the suspension to filtration to eliminate water, and drying the residue.

2. A process according to claim 1, wherein said gel of squid chitin is formed by stirring the ground squid chitin suspension.

3. A process according to claim 1, wherein said gel of squid chitin is formed by subjecting the ground squid chitin suspension to a freeze-defrost treatment.

4. A squid chitin sheet prepared by the process claimed in claims 1, 2, or 3.

5. A process of preparing squid chitin fiber comprising: dissolving squid chitin in formic acid, subjecting the solution to a freeze-defrost treatment to produce a dope, defoaming the dope in vacuo, and extruding the defoamed dope into a solvent to coagulate the dope.

6. A process according to claim 5, wherein said solvent is an alcohol, a ketone, or a mixture thereof.

7. A process according to claim 5, wherein the alcohol is methanol, ethanol, propanol or butanol, and the ketone is acetone or methyl ethyl ketone.

8. Squid chitin fiber prepared by the process claimed in claims 5, 6, or 7.

* * * * *